Oct. 25, 1966
G. D. LEWIS ETAL
3,280,789
DIVER-DOWN FLAG FLOAT
Filed Oct. 21, 1965
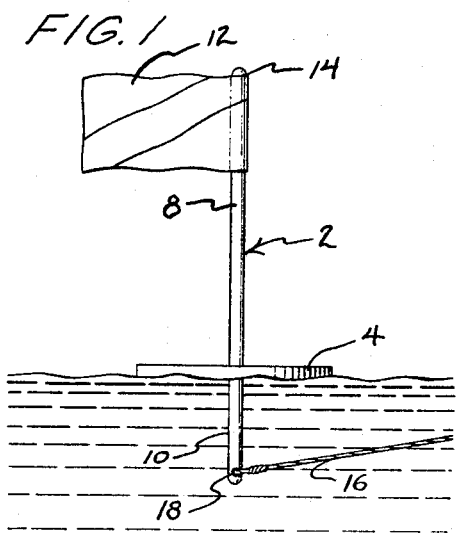
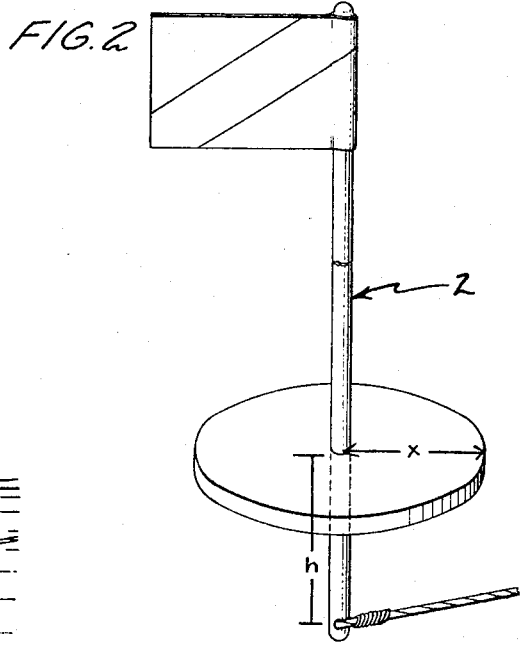
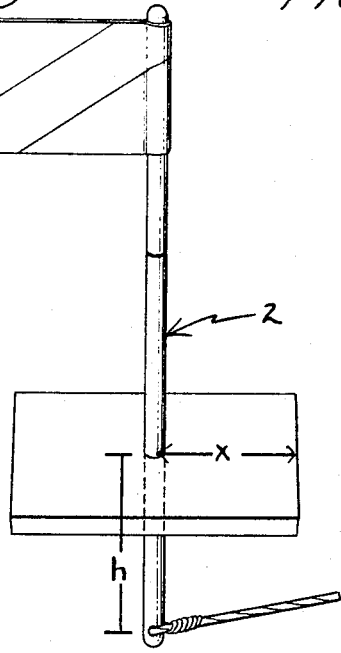
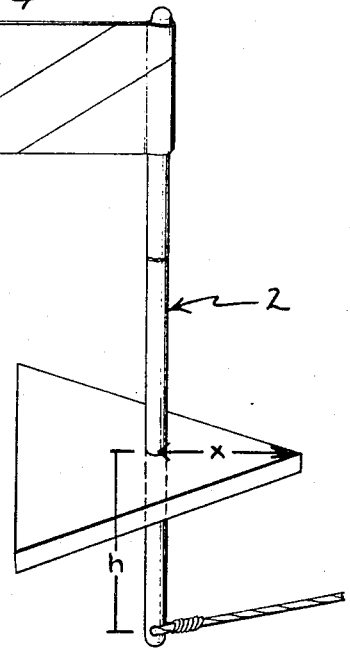
INVENTORS
GEORGE D. LEWIS
BURTON A. JONES
BY Jack M. McCarthy
AGENT 3,280,789
DIVER-DOWN FLAG FLOAT
George D. Lewis, 619 Riverside Road, and Burton A. Jones, 419 Lighthouse Drive, both of North Palm Beach, Fla.
Filed Oct. 21, 1965, Ser. No. 499,548
6 Claims. (Cl. 116—124)

This invention relates to a flag supporting means for use on water.

An object of this invention is to provide means which will float on water and support a flag on a mast, at rest, and at speeds behind towing craft to indicate a submerged person or object.

Another object of this invention is to provide a diver-down flag float having a mast with a flat float member between its ends; a diver-down flag mounted on one end above the surface of the water and tow attaching means on the other end and below the surface of the water.

A further object of this invention is to provide a diver-down flag having a flat float body capable of having shapes of various geometrical figures wherein the flat float has a dimension $x$ (radius for a circle; one-half of the side length of a square; one-half of the altitude of a triangle) within the length of the mast below the water is made greater than $0.75x$ and less than $1.5x$. Where the length of the mast below the surface of the water is equal to $h$, the formula to be used is the following $$(1) \quad 1.25x > h > 0.75x$$

Other objects and advantages will be obvious from a reading of the attached specification and claims in conjunction with the drawings.

FIG. 1 is a side view showing the diver-down flag float at rest just as it is about to start movement on the surface of the water.

FIGURE 2 is a view showing a diver-down flag float having a flat float member shaped as a circle 20 with the mast at the center.

FIGURE 3 is a view showing a diver-down flag float having a flat float member shaped as a polygon 22 with the mast at the center.

FIGURE 4 is a view showing a diver-down flag float having a flat float member shaped as a triangle 24 with the mast at the center.

FIGURE 1 shows the diver-down flag float 2 with its flat float member 4 positioned on the surface of the water with a mast member 6 fixed thereto with a portion 8 extending above the water and a portion 10 extending below the surface of the water. A diver-down flag 12 is affixed to the top of the mast portion 8 by a mounting means at 14. A tow rope 16 is attached by a connecting means to the lower end of the mast portion 10 at 18.

In a test run, the mast portion 8 extending above the water was equal to three feet and the length of the mast portion 10 extending below the surface of the water maintained a relation to the radius of the circular flat float member as follows $$(1) \quad 1.5x > h > 0.75x$$

where $x$ equals radius and $h$ equals length of mast portion 10.

In FIGURE 3, a poygon is shown replacing the circular flat float member, and in FIGURE 4 a triangle is shown. A typical dimension for $x$ might lie between six inches and fifteen inches for a diver-down flag float for use with a submerged device capable of carrying one man. Such a submerged device is shown in U.S. patent application Serial Number 416,243 to George D. Lewis and Burton A. Jones, filed December 7, 1964.

We claim:
1. A diver-down flag float comprising a floating means including a buoyant, substantially flat member having upper and lower surfaces with a center and peripheral edge, first elongated means projecting from the center of the upper surface, means for mounting a flag adjacent the end of said first elongated means, second elongated means projecting from the center of the lower surface, means for connecting a towing means adjacent the end of said second elongated means, said second elongated means projecting from the center of the lower surface having a length which is in a range of from .75 to 1.5 the distance from the center of the member to the peripheral edge.

2. A diver-down flag float comprising a floating means including a buoyant, substantially flat circular member having upper and lower surfaces with a center and a peripheral edge, first elongated means projecting from the center of the upper surface, means for mounting a flag adjacent the end of said first elongated means, second elongated means projecting from the center of the lower surface, means for connecting a towing means adjacent the end of said second elongated means, said second elongated means projecting from the center of the lower surface having a length which is in a range of from .75 to 1.5 the radius of the circular member.

3. A diver-down flag float comprising a floating means including a buoyant, substantially flat member shaped as a polygon having upper and lower surfaces with a center and a peripheral edge, first elongated means projecting from the center of the upper surface, means for mounting a flag adjacent the end of said first elongated means, second elongated means projecting from the center of the lower surface, means for connecting a towing means adjacent the end of said second elongated means, said second elongated means projecting from the center of the lower surface having a length which is in a range of from .75 to 1.5 the distance from the center of the member to a side of the polygon-shaped member.

4. A diver-down flag float comprising a floating means including a buoyant, substantially flat triangular member having upper and lower surfaces with a center and a peripheral edge, first elongated means projecting from the center of the upper surface, means for mounting a flag adjacent the end of said first elongated means, second elongated means projecting from the center of the lower surface, means for connecting a towing means adjacent the end of said second elongated means, said second elongated means projecting from the center of the lower surface having a length which is in a range of from .75 to 1.5 the distance from the center of the member to the peripheral edge.

5. A diver-down flag float comprising a floating means including a buoyant, substantially flat member having upper and lower surfaces with a center and a peripheral edge, first elongated means projecting from the center of the upper surface, means mounting a flag adjacent the end of said first elongated means, second elongated means projecting from the center of the lower surface, means for connecting a towing means adjacent the end of said second elongated means, said first elongated means being approximately three feet in length, said second elongated means projecting from the center of the lower surface having a length which is in a range of from .75 to 1.5 the distance from the center of the member to the peripheral edge.

6. A diver-down flag float comprising a floating means including a buoyant, substantially flat circular member having upper and lower surfaces with a center and a peripheral edge, first elongated means projecting from the center of the upper surface, means mounting a flag adjacent the end of said first elongated means, second elongated means projecting from the center of the lower surface, means for connecting a towing means adjacent the end of said second elongated means, said first elongated means being approximately three feet in length, said second elongated means being approximately 14″ in length and the radius of said circular member being approximately 12″.

References Cited by the Examiner

UNITED STATES PATENTS

| | | | |
|---|---|---|---|
| 1,860,327 | 5/1932 | Kuhn | 9—9 |
| 2,418,549 | 4/1947 | De Rugeris | 116—173 |
| 3,105,459 | 10/1963 | Conn | 116—124.9 |

FOREIGN PATENTS 496,986  8/1919  France.

LOUIS J. CAPOZI, *Primary Examiner.*